US006285943B1

(12) United States Patent
Boulter

(10) Patent No.: US 6,285,943 B1
(45) Date of Patent: Sep. 4, 2001

(54) ROAD SPEED CONTROL SYSTEM

(76) Inventor: Keri C. Boulter, 366 8th Street, Nanaimo BC (CA), V9R 1B1

( * ) Notice: Subject to any disclaimer, the term of this patent is extended or adjusted under 35 U.S.C. 154(b) by 0 days.

(21) Appl. No.: 09/689,949

(22) Filed: Oct. 13, 2000

(51) Int. Cl.[7] .............................. G06F 7/00; G06F 17/00

(52) U.S. Cl. ............................ 701/93; 701/119; 701/121; 180/170; 340/905; 340/907

(58) Field of Search ............................ 701/93, 119, 121; 340/905, 907, 993, 936; 180/167, 169, 170; 700/304

(56) References Cited

U.S. PATENT DOCUMENTS

| | | | |
|---|---|---|---|
| 3,655,962 | 4/1972 | Kock . | |
| 4,068,734 | 1/1978 | Foeller . | |
| 4,166,514 | 9/1979 | De Freminville et al. . | |
| 5,258,911 | 11/1993 | Wellman et al. . | |
| 5,294,081 | 3/1994 | Malon . | |
| 5,485,161 | 1/1996 | Vaughn . | |
| 5,654,891 * | 8/1997 | Naccache et al. | 701/119 |
| 5,793,477 | 8/1998 | Laakmann . | |

* cited by examiner

*Primary Examiner*—William A. Cuchlinski, Jr.
*Assistant Examiner*—Gertrude Arthur

(57) ABSTRACT

A road speed control system for preventing motorists from speeding on roads. The road speed control system includes roadside transmitter/receiver members being adapted to be erected along roadsides where speed limits on roads change; and also includes a vehicle speed control assembly being adapted to be disposed in a vehicle; and further includes a monitoring and transmitting assembly for police.

13 Claims, 4 Drawing Sheets

ROAD SPEED CONTROL SYSTEM

BACKGROUND OF THE INVENTION

1. Field of the Invention

The present invention relates to a road speed limiter and more particularly pertains to a new road speed control system for preventing motorists from speeding on roads.

2. Description of the Prior Art

The use of a road speed limiter is known in the prior art. More specifically, a road speed limiter heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 4,166,514; U.S. Pat. No. 4,068,734; U.S. Pat. No. 5,793,477; U.S. Pat, No. 5,485,161; U.S. Pat. No. 5,294,081; U.S. Pat. No. 3,655,962; and U.S. Pat. No. 5,258,911.

While these devices fulfill their respective, particular objectives and requirements, the aforementioned patents do not disclose a new road speed control system. The inventive device includes roadside transmitter/receiver members being adapted to be erected along roadsides where speed limits on roads change; and also includes a vehicle speed control assembly being adapted to be disposed in a vehicle; and further includes a monitoring and transmitting assembly for police.

In these respects, the road speed control system according to the present invention substantially departs from the conventional concepts and designs of the prior art, and in so doing provides an apparatus primarily developed for the purpose of preventing motorists from speeding on roads.

SUMMARY OF THE INVENTION

In view of the foregoing disadvantages inherent in the known types of road speed limiter now present in the prior art, the present invention provides a new road speed control system construction wherein the same can be utilized for preventing motorists from speeding on roads.

The general purpose of the present invention, which will be described subsequently in greater detail, is to provide a new road speed control system which has many of the advantages of the road speed limiter mentioned heretofore and many novel features that result in a new road speed control system which is not anticipated, rendered obvious, suggested, or even implied by any of the prior art road speed limiter, either alone or in any combination thereof.

To attain this, the present invention generally comprises roadside transmitter/receiver members being adapted to be erected along roadsides where speed limits on roads change; and also includes a vehicle speed control assembly being adapted to be disposed in a vehicle; and further includes a monitoring and transmitting assembly for police.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new road speed control system which has many of the advantages of the road speed limiter mentioned heretofore and many novel features that result in a new road speed control system which is not anticipated, rendered obvious, suggested, or even implied by any of the prior art road speed limiter, either alone or in any combination thereof.

It is another object of the present invention to provide a new road speed control system which may be easily and efficiently manufactured and marketed.

It is a further object of the present invention to provide a new road speed control system which is of a durable and reliable construction.

An even further object of the present invention is to provide a new road speed control system which is susceptible of a low cost of manufacture with regard to both materials and labor, and which accordingly is then susceptible of low prices of sale to the consuming public, thereby making such road speed control system economically available to the buying public.

Still yet another object of the present invention is to provide a new road speed control system which provides in the apparatuses and methods of the prior art some of the advantages thereof, while simultaneously overcoming some of the disadvantages normally associated therewith.

Still another object of the present invention is to provide a new road speed control system for preventing motorists from speeding on roads.

Yet another object of the present invention is to provide a new road speed control system which includes roadside transmitter/receiver members being adapted to be erected along roadsides where speed limits on roads change; and also includes a vehicle speed control assembly being adapted to be disposed in a vehicle; and further includes a monitoring and transmitting assembly for police.

Still yet another object of the present invention is to provide a new road speed control system that will hopefully save lives and prevent accidents.

Even still another object of the present invention is to provide a new road speed control system that automatically changes the speed of the vehicle when the speed zones change.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
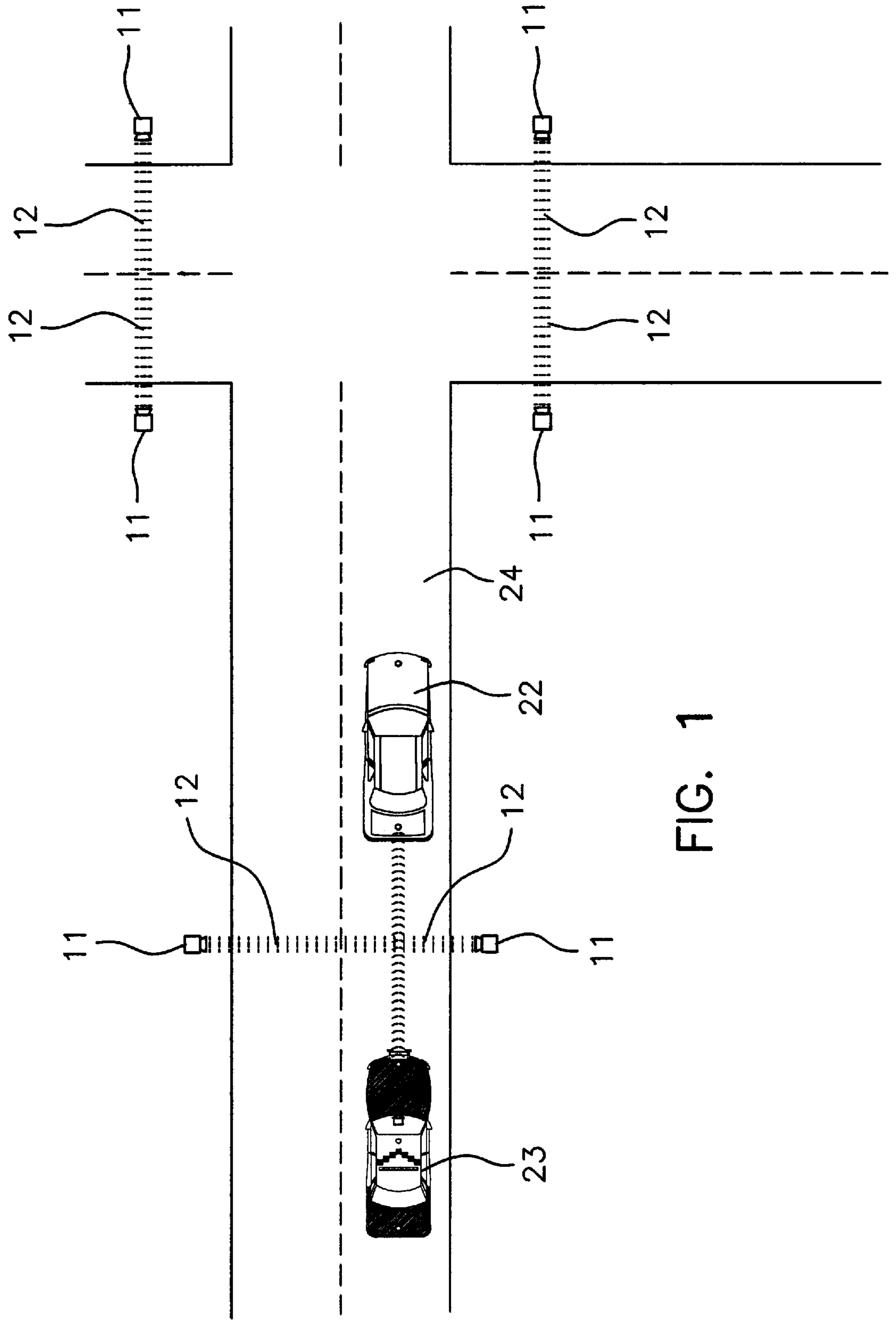
FIG. 1 is a top plan view of a new road speed control system according to the present invention and shown in use.
Figure 2:
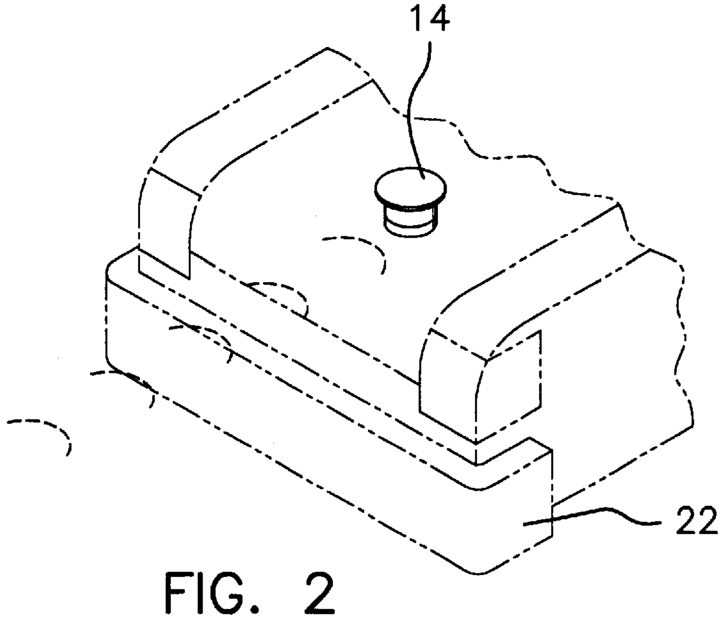
FIG. 2 is a perspective view of the rear receiver of the present invention.
Figure 3:
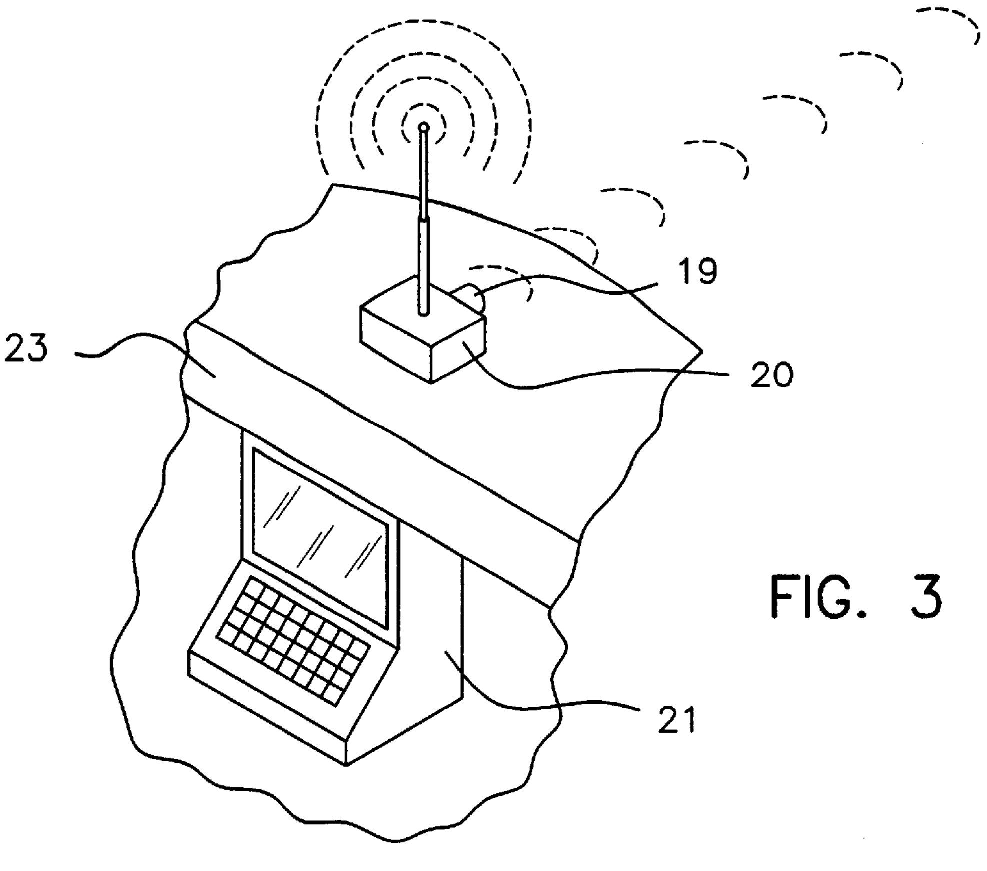
FIG. 3 is a perspective view of the present invention.
Figure 4:
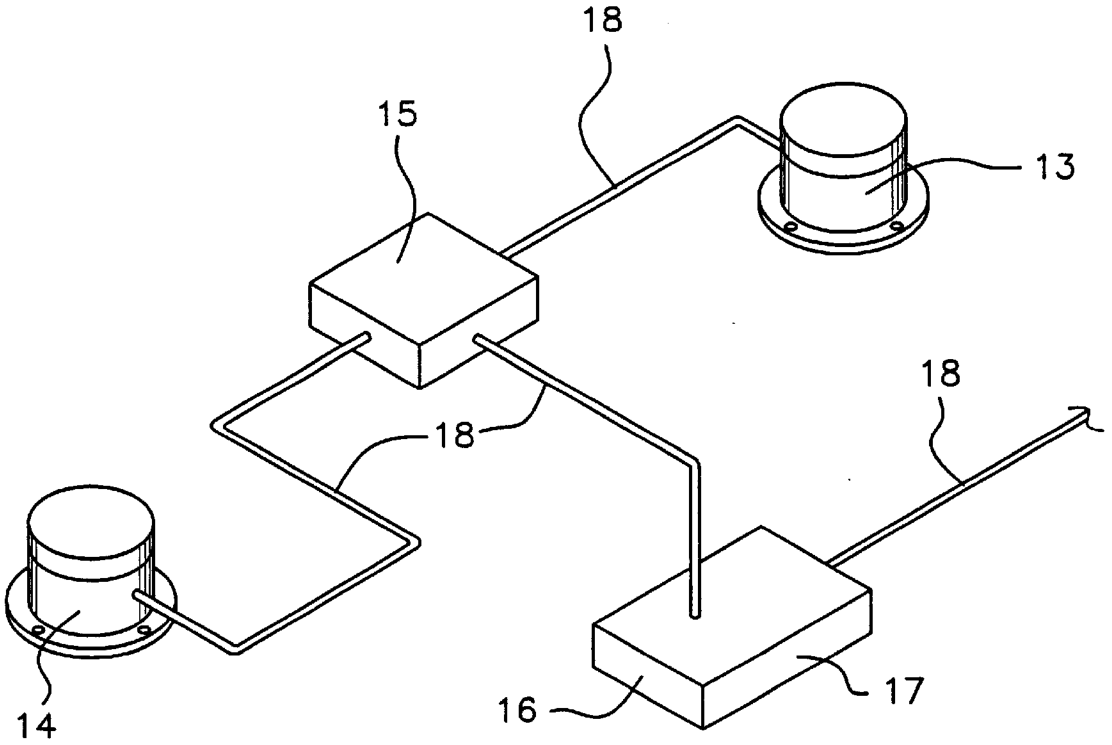
FIG. 4 is a perspective view of the vehicle speed control assembly of the present invention.
Figure 5:
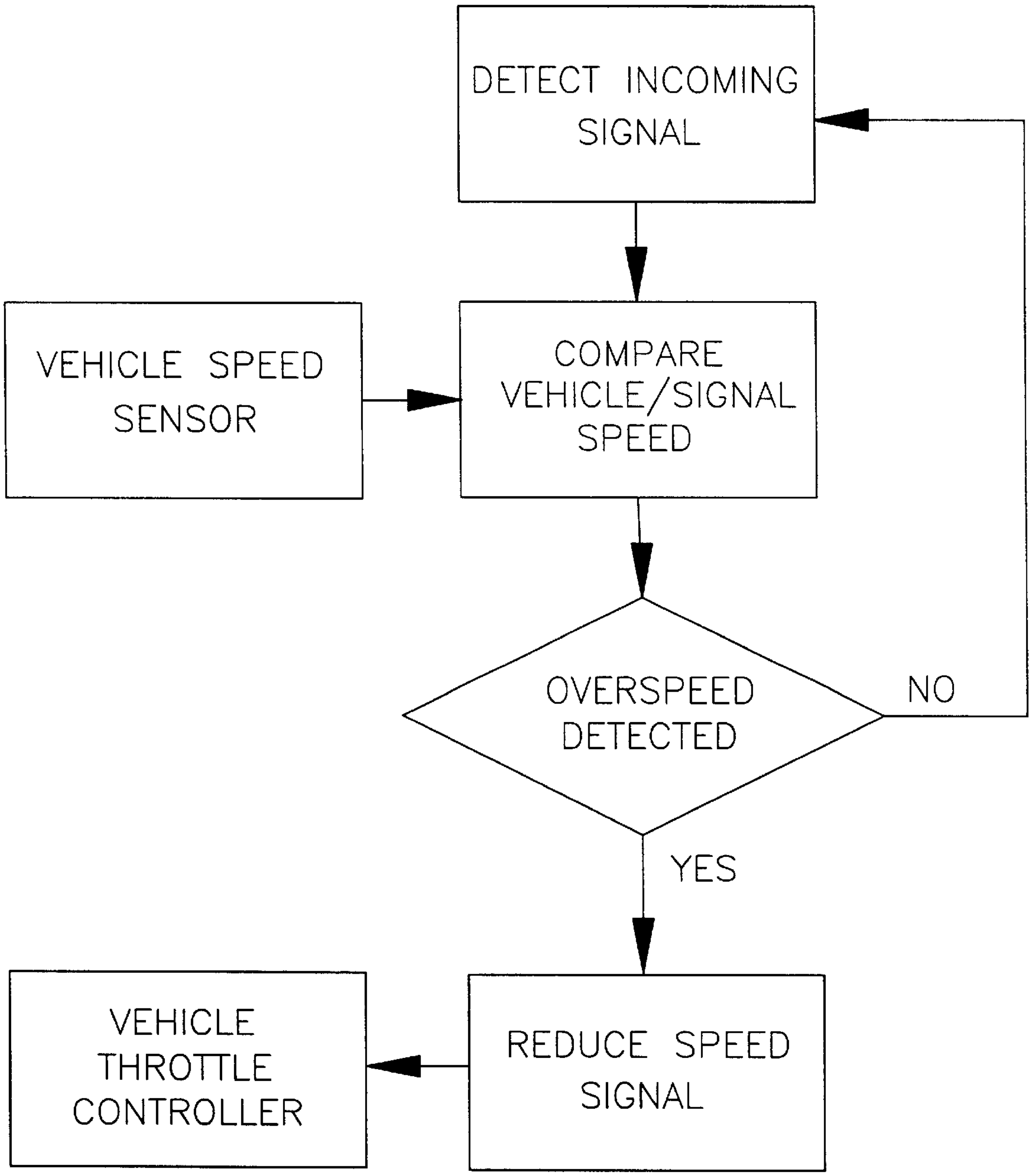
FIG. 5 is a flow diagram of the present invention.

With reference now to the drawings, and in particular to FIGS. 1 through 5 thereof, a new road speed control system embodying the principles and concepts of the present invention will be described.

As best illustrated in FIGS. 1 through 5, the road speed control system generally comprises roadside transmitter/receiver members 11 being adapted to be conventionally erected along roadsides where speed limits on roads 24 change. Each of the roadside transmitter/receiver members 11 emits a radio wave signal 12 upon a road 24. The radio wave signal indicates a maximum speed for that particular road 24. Each of the roadside transmitter/receiver members 11 is adapted to direct a respective radio wave signal 12 upon a portion of the road 24 where the speed limit changes depending upon direction of the vehicle 22. Each of the roadside transmitter/receiver members 11 is adapted to receive wave signals as to a speed of the vehicle 22.

A vehicle speed control assembly being adapted to be disposed in a vehicle 22 includes a microprocessor unit 15 being adapted to be conventionally disposed in the vehicle 22, and also includes a front receiver unit 13 being connected with wires 18 to the microprocessor unit 15 and being adapted to be disposed in a front portion of the vehicle 22, and further includes a rear receiver unit 14 being conventionally connected with wires 18 to the microprocessor unit 15 and being adapted to be conventionally disposed in a rear portion of the vehicle 22, and also includes a road speed sensor 16 being connected with wires 18 to the microprocessor unit 15 and being adapted to identify the speed of the vehicle 22 upon the road 24, and further includes a throttle control module 17 being connected with wires 18 to the microprocessor unit 15 and being adapted to be conventionally connected to an engine throttle. The front and rear receiver units 13,14 are adapted to receive the radio wave signals 12 being transmitted by the roadside transmitter members 11 and being adapted to transform the radio wave signals 12 into information readable by the microprocessor unit 15. The microprocessor unit 15 is adapted to receive information as to the speed of the vehicle 22 upon the road 24 from the road speed sensor 16 and to receive the information from the front and rear receiver units 13,14 as to the speed limit for that road 24. The microprocessor unit 15 is adapted to compare the road speed information with the speed limit information and to actuate the throttle control module 17 when the road speed is greater than the speed limit. Upon activation by the microprocessor unit 15, the throttle control module 17 is adapted to slow the engine down in accordance to the identified speed limit.

A monitoring and transmitting assembly for police includes a computer 21 being adapted to be conventionally disposed in a police car 23, and also includes a transmitter device 19 and a receiver device 20. The transmitter device 19 is adapted to transmit a signal to the front and rear receiver units 13,14 to bring the vehicle 22 to a complete stop. The receiver device 20 is adapted to receive signals from the road transmitter/receiver members 11 as to the speed of the vehicle 22.

In use, signals 12 are detected by the front and rear receiver units 13,14 from the roadside transmitting/receiving members 11 as to speed limit, and the speed of the vehicle 22 is detected by the road speed sensor 16. The speed limit and the road speed of the vehicle 22 is compared by the microprocessor unit 15, and upon the road speed being greater than the speed limit, the speed of the vehicle 22 is reduced by the throttle control module 17 to that of the speed limit as identified by the signal.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A road speed control system comprising:

roadside transmitter/receiver members for positioning along roadsides where speed limits on roads change;

a vehicle speed control assembly for disposing in a vehicle; and a monitoring and transmitting assembly for police;

wherein each of said roadside transmitter/receiver members emits a radio wave signal upon a road, said radio wave signal indicating a maximum speed for that particular road, each of said roadside transmitter/receiver members including means for directing a respective said radio wave signal upon a portion of the road where the speed limit changes depending upon direction of the vehicle, each of said roadside transmitter/receiver members including means for receiving signals as to a speed of the vehicle.

2. A road speed control system as described in claim 1, wherein said vehicle speed control assembly includes a microprocessor unit for disposing in the vehicle, and also includes a front receiver unit being connected to said microprocessor unit and being for disposing in a front portion of the vehicle, and further includes a rear receiver unit being connected to said microprocessor unit and being for disposing in a rear portion of the vehicle, and also includes a road speed sensor being connected to said microprocessor unit and including means for identifying the speed of the vehicle upon the road, and further includes a throttle control module being connected to said microprocessor unit and including means for connecting to an engine throttle.

3. A road speed control system as described in claim 2, wherein said front and rear receiver units include means for receiving said radio wave signals being transmitted by said roadside transmitter members and means for transforming said radio wave signals into information readable by said microprocessor unit.

4. A road speed control system as described in claim 3, wherein said microprocessor unit includes means for receiving information as to the speed of the vehicle upon the road from said road speed sensor and for receiving the information from said front and rear receiver units as to the speed limit for that road, said microprocessor unit including means for comparing the road speed information with the speed limit information and for actuating said throttle control module when the road speed is greater than the speed limit.

5. A road speed control system as described in claim 2, wherein upon activation by said microprocessor unit, said throttle control module including means for slowing the engine down in accordance to the identified speed limit.

6. A road speed control system as described in claim 2, wherein said monitoring and transmitting assembly for police includes a computer for disposing in a police car, and also includes a transmitter device and a receiver device, said transmitter device including means for transmitting a signal to said front and rear receiver units to bring the vehicle to a complete stop, said receiver device including means for receiving signals from said road transmitter/receiver members.

7. A method of using a road speed control system includes the steps of:

providing roadside transmitting/receiving members along roadside, and also providing front and rear receiver units, and a mirroprocessor units, and a road speed senor, and a throttle control module in a vehicle;

detecting signal by said front and rear receiver units from said roadside transmitting/receiving members as to speed limit;

detecting speed of the vehicle by said road speed senor;

comparing the signal as to speed limit with the speed of the vehicle by said microprocessor unit; and reducing the speed of the vehicle by said throttle control module to that of the speed limit as identified by the signal.

8. A road speed control system comprising:

roadside transmitter/receiver members for positioning along roadsides where speed limits on roads change;

a vehicle speed control assembly for disposing in a vehicle; and a monitoring and transmitting assembly for police;

wherein each of said roadside transmitter/receiver members emits a radio wave signal upon a road, said radio wave signal indicating a maximum speed for that particular road, each of said roadside transmitter/receiver members directing a respective said radio wave signal upon a portion of the road where the speed limit changes depending upon direction of the vehicle, each of said roadside transmitter/receiver members receiving signals as to a speed of the vehicle.

9. A road speed control system as described in claim 8, wherein said vehicle speed control assembly includes a microprocessor unit for disposing in the vehicle, and also includes a front receiver unit being connected to said microprocessor unit and being for disposing in a front portion of the vehicle, and further includes a rear receiver unit being connected to said microprocessor unit and being for disposing in a rear portion of the vehicle, and also includes a road speed sensor being connected to said microprocessor unit and identifying the speed of the vehicle upon the road, and further includes a throttle control module being connected to said microprocessor unit and being adapted to be connected to an engine throttle.

10. A road speed control system as described in claim 9, wherein said front and rear receiver units receive said radio wave signals being transmitted by said roadside transmitter members and transform said radio wave signals into information readable by said microprocessor unit.

11. A road speed control system as described in claim 10, wherein said microprocessor unit receives information as to the speed of the vehicle upon tie road from said road speed sensor and receives the information from said front and rear receiver units as to the speed limit for that road, said microprocessor unit comparing the road speed information with the speed limit information and actuating said throttle control module when the road speed is greater than the speed limit.

12. A road speed control system as described in claim 9, wherein upon activation by said microprocessor unit, said throttle control module slowing the engine down in accordance to the identified speed limit.

13. A road speed control system as described in claim 9, wherein said monitoring and transmitting assembly for police includes a computer for disposing in a police car, and also includes a transmitter device and a receiver device, said transmitter device transmitting a signal to said front and rear units to bring the vehicle to a complete stop, said receiver device receiving signal from said road transmitter/receiver members.

* * * * *